(12) United States Patent
German et al.

(10) Patent No.: US 12,365,548 B2
(45) Date of Patent: Jul. 22, 2025

(54) SYSTEM AND METHOD FOR IDENTIFYING AND TRANSPORTING NON-CONVEYABLE ITEMS

(71) Applicant: Dematic Corp., Grand Rapids, MI (US)

(72) Inventors: Harry Thad German, Belding, MI (US); Tyler Ernest, Cedar Springs, MI (US); Jeffrey D. Miller, Comstock Park, MI (US)

(73) Assignee: Dematic Corp., Grand Rapids, MI (US)

( * ) Notice: Subject to any disclaimer, the term of this patent is extended or adjusted under 35 U.S.C. 154(b) by 238 days.

(21) Appl. No.: 18/056,762

(22) Filed: Nov. 18, 2022

(65) Prior Publication Data

US 2023/0159280 A1    May 25, 2023

Related U.S. Application Data

(60) Provisional application No. 63/281,158, filed on Nov. 19, 2021.

(51) Int. Cl.
   *B65G 43/08* (2006.01)
   *B07C 1/00* (2006.01)
   (Continued)

(52) U.S. Cl.
   CPC ............... *B65G 43/08* (2013.01); *B07C 5/02* (2013.01); *B65G 43/10* (2013.01); *B07C 1/00* (2013.01);
   (Continued)

(58) Field of Classification Search
   CPC .. B07C 5/02; B07C 1/00; B65G 43/00; B65G 43/08; B65G 43/10; B65G 2203/0225; B65G 2203/0291; B65G 2203/044
   (Continued)

(56) References Cited

U.S. PATENT DOCUMENTS

| | | |
|---|---|---|
| 2014/0148944 A1 | 5/2014 | Bailey et al. |
| 2014/0350717 A1 | 11/2014 | Dagle et al. |

(Continued)

FOREIGN PATENT DOCUMENTS

| | | | | |
|---|---|---|---|---|
| EP | 1421999 A3 | * | 11/2005 | ............... B07C 5/10 |
| EP | 4299478 A1 | * | 1/2024 | ............. B65G 13/10 |

(Continued)

OTHER PUBLICATIONS

International Search Report and Written Opinion from corresponding Patent Cooperation Treaty (PCT) Application No. PCT/IB22/61151, completed Feb. 7, 2023.

*Primary Examiner* — James R Bidwell
(74) *Attorney, Agent, or Firm* — Gardner, Linn, Burkhart & Ondersma LLP (57) ABSTRACT

An assessment system and method are provided for determining whether an item handled in a material handling system is stable and conveyable or unstable and non-conveyable. If an item is deemed non-conveyable, it is diverted or otherwise removed from the material handling system before it is transported downstream where it may affect the operation of the system or cause damage to the system and/or item. The system utilizes a dimension sensor system, such as including photo arrays, to measure contact region dimensions between an item being conveyed and the conveyor surface. The contact region is observed under constant conveyance rates, accelerating conveyance rates, and decelerating conveyance rates to determine whether the item orientation changes due to shifts in momentum. Any measured contact region changes are compared to a maximum allowed value, and if the measured change is greater than the maximum, the item is deemed non-conveyable.

20 Claims, 4 Drawing Sheets

(51) Int. Cl.
  *B07C 5/02*   (2006.01)
  *B65G 43/00*  (2006.01)
  *B65G 43/10*  (2006.01)
(52) U.S. Cl.
  CPC ...... *B65G 43/00* (2013.01); *B65G 2203/0225* (2013.01); *B65G 2203/0291* (2013.01); *B65G 2203/044* (2013.01)
(58) Field of Classification Search
  USPC ..................................................... 198/464.4
  See application file for complete search history.

(56) References Cited

U.S. PATENT DOCUMENTS

| | | | | |
|---|---|---|---|---|
| 2020/0160011 | A1* | 5/2020 | Wagner | B65G 25/04 |
| 2021/0362194 | A1* | 11/2021 | Lundahl | B07C 3/14 |
| 2022/0267100 | A1* | 8/2022 | Ramesh | B65G 43/08 |
| 2023/0242353 | A1* | 8/2023 | Tondreau, III | G01N 23/083 |
| | | | | 198/459.6 |

FOREIGN PATENT DOCUMENTS

| | | | | | |
|---|---|---|---|---|---|
| WO | WO-2006007386 | A1 * | 1/2006 | ............. | G06K 17/00 |
| WO | 2019161983 | A1 | 8/2019 | | |
| WO | WO-2022040322 | A1 * | 2/2022 | ............. | B07C 3/003 |

\* cited by examiner

SYSTEM AND METHOD FOR IDENTIFYING AND TRANSPORTING NON-CONVEYABLE ITEMS

CROSS REFERENCE TO RELATED APPLICATION

The present application claims priority of U.S. provisional application Ser. No. 63/281,158 filed Nov. 19, 2021, which is hereby incorporated by reference herein in its entirety.

FIELD OF THE INVENTION

The present invention is directed to material handling systems, and in particular material handling conveyors.

BACKGROUND OF THE INVENTION

Material handling systems for warehouse, order-fulfillment facilities, common carriers, and the like, commonly handle items, products, packages, etc., having varying shapes, sizes, weights, configurations, and orientations. In some instances, packages may have a characteristic that creates issues for the material handling system. For example, an exceedingly long package may become stuck in a curved stretch of conveyor, the momentum of an exceedingly heavy object may cause damage to a guide on a conveyor, an item with a relatively high center of gravity (CG) may tip over a conveyor guide and fall off the conveyor system, etc. Round, non-symmetrical, and otherwise oddly shaped items and very lightweight items may create many different issues and problems within material handling systems. For example, the following issues may commonly occur within conveyance systems when handling oddly shaped items: "no-reads" in which label scanners are unable to read a label on a product; jams and faults due to the shape, weight, or orientation of a product; damage to equipment and/or guardrails, such as from falling or tipping products; and damage to products which may ultimately be sent on to a soon-to-be disappointed or upset customer.

SUMMARY OF THE INVENTION

The present invention provides a system and method for identifying and subsequently safely handling unstable or challenging products, which may be otherwise referred to as a non-conveyable product or item. The system and method are particularly beneficial for identifying non-conveyable items before they enter a more complex function of a material handling system, such as before they are inducted into a sortation system, for example. Once identified, non-conveyable items may be removed from the primary conveyance systems and handled with an appropriate level of care. Many commonly occurring issues or mishaps may be eliminated or greatly reduced by identifying and removing non-conveyable product from the system that are considered. For example, the system and method may facilitate a reduction in label no-reads, a reduction in jams and faults within conveyance systems, a reduction in damage to equipment and/or guardrails, and reduction in damage to products. Non-conveyable products or items may include, but are not limited to, items with high center of gravity (CG), and round, elliptical, spheroid, ellipsoid, octahedron, and/or non-symmetrical items, for example.

According to one form of the present invention, a method is provided for determining the conveyability of an item transported by a transportation or material handling system of a material handling facility and includes transporting a subject item with an upstream portion of the material handling system to an item assessment conveyor system. The assessment conveyor system is operable to convey an item at varying rates, including a constant rate, an accelerating rate, and a decelerating rate. The assessment conveyor system is operated at the constant rate and a sensor system positioned at the assessment conveyor system measures a dimension of a contact region between the subject item and the conveyance surface of the assessment conveyor system. This measurement may be referred to as a constant rate contact region dimension. The assessment conveyor system is then operated at the accelerating rate and the sensor system measures a dimension of the contact region between the subject item and the conveyance surface. This measurement may be referred to as an accelerating rate contact region dimension. The assessment conveyor system is then operated at the decelerating rate and the sensor system measures a dimension of the contact region between the subject item and the conveyance surface. This measurement may be referred to as a decelerating rate contact region dimension.

The method assesses whether the subject item is conveyable or non-conveyable as a function of the measured contact region dimensions. The computer determines a relative orientation change of the subject item by comparing two or more of the measured contact region dimensions (e.g. constant rate contact region dimension, accelerating rate contact region dimension, and/or decelerating rate contact region dimension). The relative orientation change(s) is compared with a user defined maximum orientation change threshold, which is selected by the user prior to operation of the system. If the relative orientation change is less than the user defined maximum orientation change threshold, the subject item is determined to be conveyable and is transported downstream toward a downstream function or process with a conveyable item handling function or system (e.g. a primary conveyor or transportation device that is capable of handling conveyable items) of the material handling system. However, if the relative orientation change is greater than the user defined maximum orientation change, the subject item is determined to be non-conveyable and is diverted away from the primary conveyor to an item handling function or system capable of handling non-conveyable items (e.g. a bulk item transportation system, such as a heavy duty conveyor system, an autonomous mobile robot (AMR), or a manually operated cart).

In one aspect, the assessment conveyor system includes a sequence or arrangement of consecutively spaced belt conveyors including a first belt conveyor, a second belt conveyor, and a third belt conveyor. The first belt conveyor is operable to convey an item at the constant rate, the second belt conveyor is operable to convey an item at the accelerating rate, and the third belt conveyor is operable to convey an item at the decelerating rate. In another aspect, the sensor system includes a first sensor at the first belt conveyor, a second sensor at the second belt conveyor, and a third sensor at the third belt conveyor. The constant rate contact region is measured by the first sensor, the accelerating rate contact region rate contact region is measured by second sensor, and the decelerating rate contact region is measured by the third sensor. In yet another aspect, at least one of the dimensions being measured for the constant rate contact region, accelerating rate contact region, and decelerating rate contact region each includes a dimension that is parallel to the forward direction of travel of the assessment conveyor system.

In another form of the present invention, an item conveyability assessment system is provided for determining whether an item is safely conveyable within a material handling system. The assessment system includes a variable rate conveyor system, in the form of a sequence or arrangement of consecutively spaced belt conveyors, such as a first belt conveyor, a second belt conveyor, and a third belt conveyor, for example. In such configurations, the first belt conveyor is at least operable at a constant conveyance rate, the second belt conveyor is at least operable at an accelerating conveyance rate, and the third belt conveyor is at least operable at a decelerating conveyance rate. A sensor system is provided with the assessment system to measure at least one dimension of a contact region between the item being conveyed and the conveyor surface. The sensor system may include a first sensor adjacent the first belt conveyor, a second sensor adjacent the second belt conveyor, and a third sensor adjacent the third belt conveyor. The sensors may utilize photoelectric arrays, cameras, or various other known sensor systems adapted for sensing or making measurements in one or more dimensions. Optionally, the sensor system measures a dimension of the contact region in the direction that is parallel to the forward direction of travel of the assessment conveyor system.

Accordingly, forms of the present invention provides a system and a method for automatically determining whether a particular item is stable or otherwise safe to handle within a material handling system. The system utilizes a variable rate conveyor system to convey the item, accelerate the item, and decelerate the item to determine if the item's orientation shifts due to momentum changes. If an item exhibits any orientation shifts greater than a user defined maximum value, the item is deemed non-conveyable and is removed from the primary portion of the material handling system. Thereby, the method and system may reduce or eliminate faults within the material handling system and/or reduce or eliminate damage to the system or item that may be caused by the item shifting during its conveyance.

These and other objects, advantages, purposes and features of this invention will become apparent upon review of the following specification in conjunction with the drawings.

DESCRIPTION OF THE PREFERRED EMBODIMENTS

Referring now to the drawings and the illustrative embodiments depicted therein, an item conveyability determination or assessment conveyor system 10 and a method 100 are provided for determining the conveyability of an item or package 12 in a material handling system 14, such as items being handled in a warehouse, order fulfillment facility, or other material handling facility. In particular, the system 10 and method 100 are particularly well-suited for identifying and appropriately transporting "non-conveyable" items or packages 12, which may include such items as round, elliptical, spheroid, ellipsoid, octahedron, and/or non-symmetrical items, items with insufficient weight to maintain sufficient contact with a conveying surface whereby the conveying surface may slip or slide underneath the item, items with an unstable center of gravity (CG), and otherwise oddly shaped or difficult to handle items. The system 10 utilizes a sensor system 16 to determine or measure a contact area between an item being conveyed and the conveyor surface that is conveying the item. It is contemplated that the system 10 may be utilized at any desired position within a facility. For example, the system 10 may be provided at a receiving subsystem to assess the conveyability of all items as they are received into the facility. As such, the system 10 and method 100 may filter out all non-conveyable items before they enter the primary or main conveyance components within the facility, thereby limiting potential problems or mishaps caused by non-conveyable items. The system 10 may be provided within new or existing facilities, such as in a retrofit manner.

Referring to the illustrative embodiments of FIG. 1-4, the item assessment conveyor system 10 defines a portion of the material handling system 14 and includes an arrangement or sequence of consecutive belt conveyors, including a first belt conveyor 18, a second belt conveyor 20, and a third belt conveyor 22 to transport items at variable or changing rates relative to one another. The conveyor system 10 is configured to receive items from an upstream process, such as an upstream conveyor or conveyance system or an autonomous mobile robot (AMR), for example. The sensor system 16 is provided with the system 10 and is defined by a set of photo arrays 24, 26, and 28 positioned in proximity or adjacent to respective belt conveyors 18, 20, and 22. The material handling system 14 includes a primary or main conveyor 30 downstream of the third belt conveyor 22. The primary conveyor 30 directs or handles conveyable items toward downstream functions of the material handling system 14, such as sorters, storage systems, packing stations, pick or decant workstations, and the like. A divert system, in the form of a steerable wheel or ball transfer diverter 32, is provided along the primary conveyor 30 and is operable to divert non-conveyable items 12 away from the primary conveyor 30 to a secondary item handler, as depicted in the form of a belt conveyor 33, prior to entering the remainder of the material handling system 14. The secondary item handler conveyor 33 or other transportation systems and any functions or processes downstream of handler 33 are capable of safely handling non-conveyable items. Examples of suitable secondary item handler conveyors or transportations systems include bulk item transportation systems, such as heavy duty conveyor systems, autonomous mobile robots (AMR), and manually operated carts The material handling system 14 is controlled by a warehouse management system that includes a computer device 35 that is programed with computer code that is adapted to control the various components of the system, including the belt conveyors 18, 20, and 22 and the photo arrays 24, 26, and 28. The computer 35 of the system 14 may comprise one or more processors as well as hardware and software, including for performing the operations discussed herein. Each belt conveyor 18, 20, and 22 includes a respective conveying surface 34, 36, and 38 upon which items 12 are supported and transported (FIGS. 1-4). Each belt conveyor 18, 20, and 22 is selectively operable to convey items at constant and/or variable rates. For example, the belt conveyors may operate at different rates relative to one another. For instance, the first belt conveyor 18 may be configured to convey items downstream at a constant conveyance rate or speed, the second belt conveyor 20 may be configured to convey items at an accelerating or increasing conveyance rate or speed, and the third belt conveyor may be configured to convey items at a decelerating or decreasing conveyance rate or speed. The accelerating rate and the decelerating rate may be abrupt or rapid enough to change the momentum of an item conveyed thereon and cause it to shift, rock, or tilt. As such, the area or region of the item in contact with the conveying surface may change as compared to when the item is traveling at a constant conveyance rate, for example.

It will be appreciated that while the system 10 is depicted with a sequence of three belt conveyors 18, 20, and 22, that more or fewer belt conveyors may be utilized, without significantly affecting the functionality of the system 10. For instance, multiple belt conveyors may not be required in all instances and a single variable rate belt conveyor may be sufficient to perform the method 100 (as described in detail below) by performing multiple steps with the single belt conveyor. For example, a single belt conveyor may operate initially at a constant rate, then an accelerating rate, and then a decelerating rate to perform method 100 before conveying the item 12 to the primary conveyor 30. Alternatively, in another example, a single belt conveyer may operate initially at an accelerating rate, then at a decelerating rate, and then at a constant rate to perform method 100 before conveying the item to the primary conveyor 30. While it is preferable to transport an item continuously in a forward direction (i.e. without reversing the transport direction of the item) at all times to maintain a constant, substantially uninterrupted forward flow of items moving along the system 10, it will be appreciated that the conveyor may be operated in reverse in some instances, which may enable or facilitate gathering additional conveyability information for an item.

Figure 1:
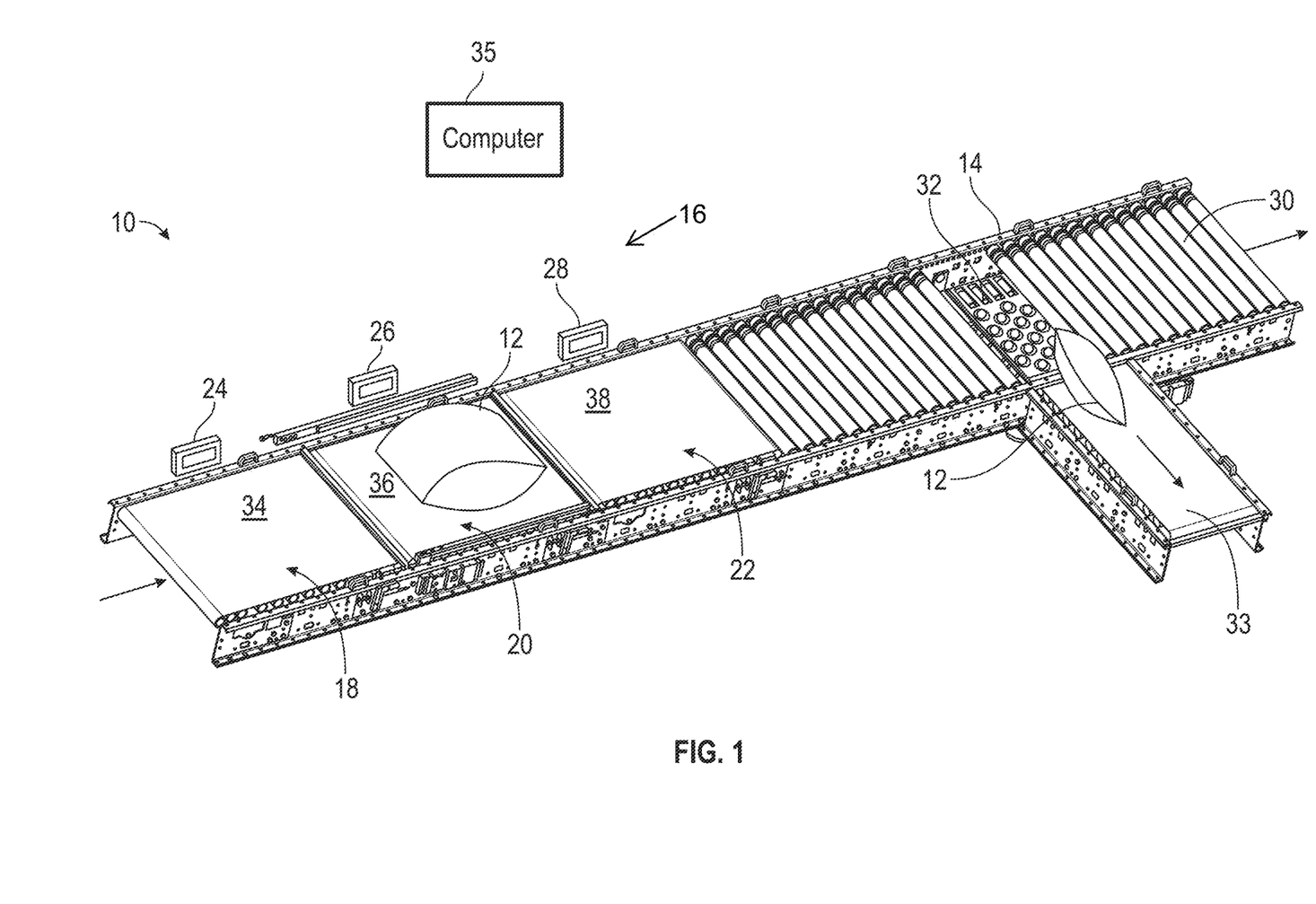
FIG. 1 is a top perspective view of an item assessment conveyor system, in accordance with the present invention.
Figure 2:
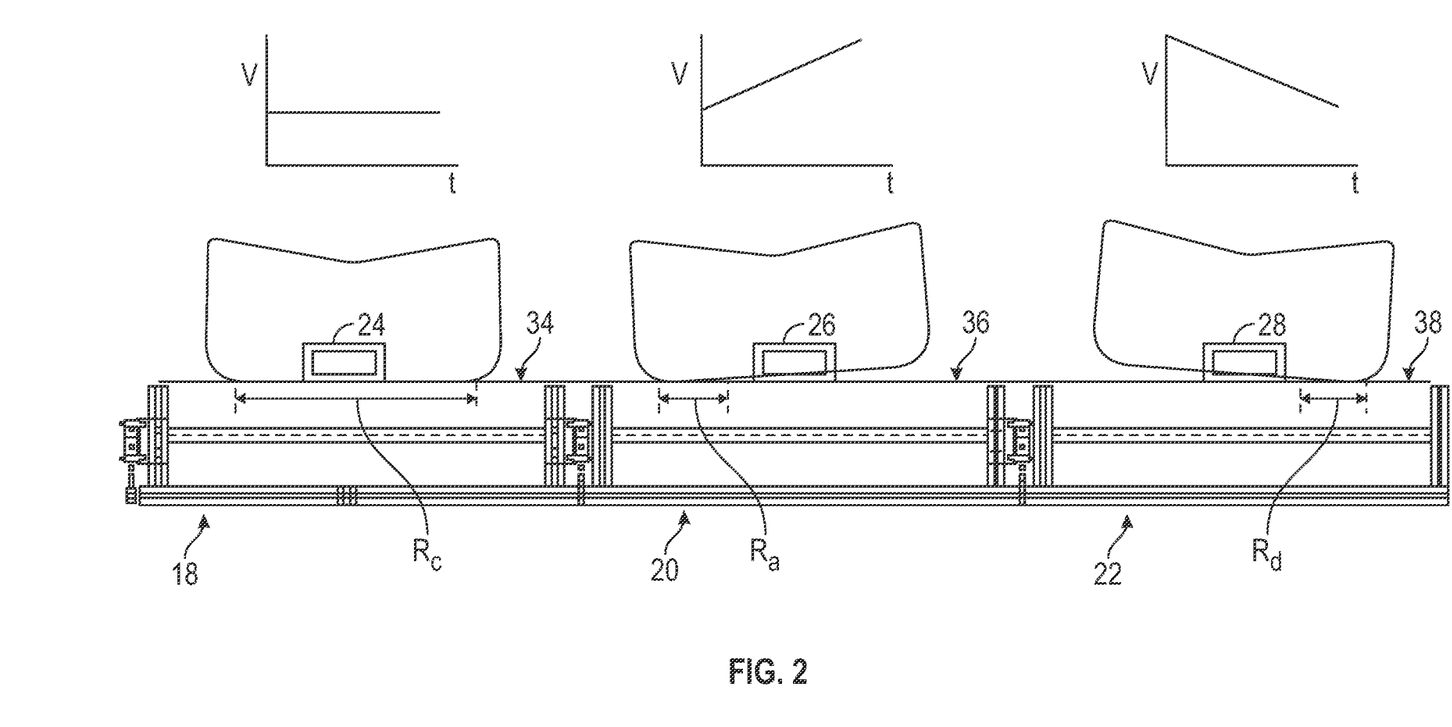
FIG. 2 is a side elevation view of a variable rate portion of the item assessment conveyor system of FIG. 1, depicting items being conveyed at different conveyance rates relative to one another.
Figure 3:
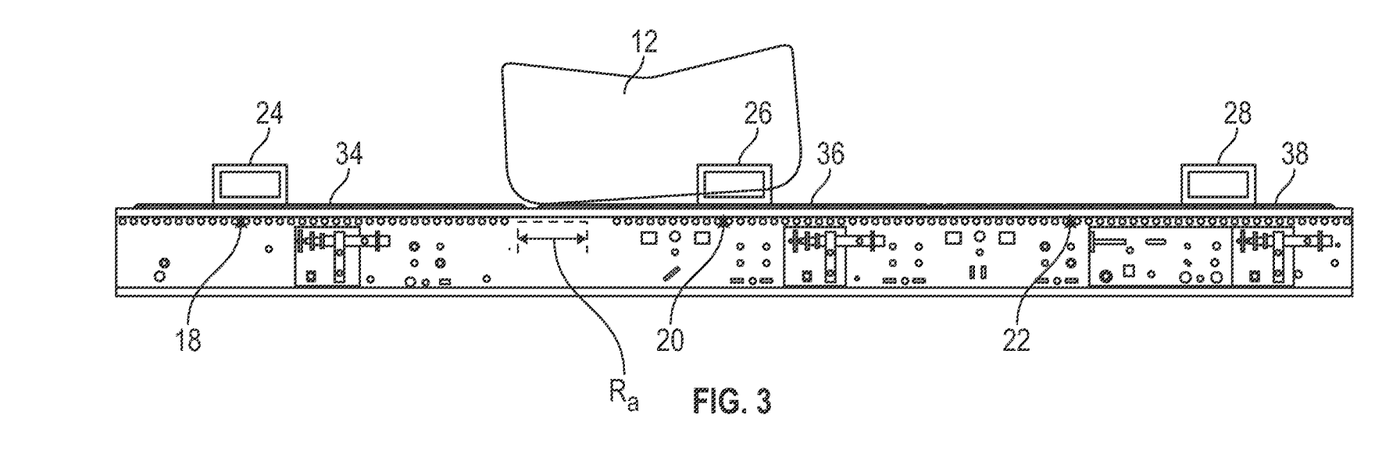
FIG. 3 is a side elevation view of the item assessment conveyor system of FIG. 1, depicting an item being conveyed at an accelerating conveyance rate.
Figure 4:
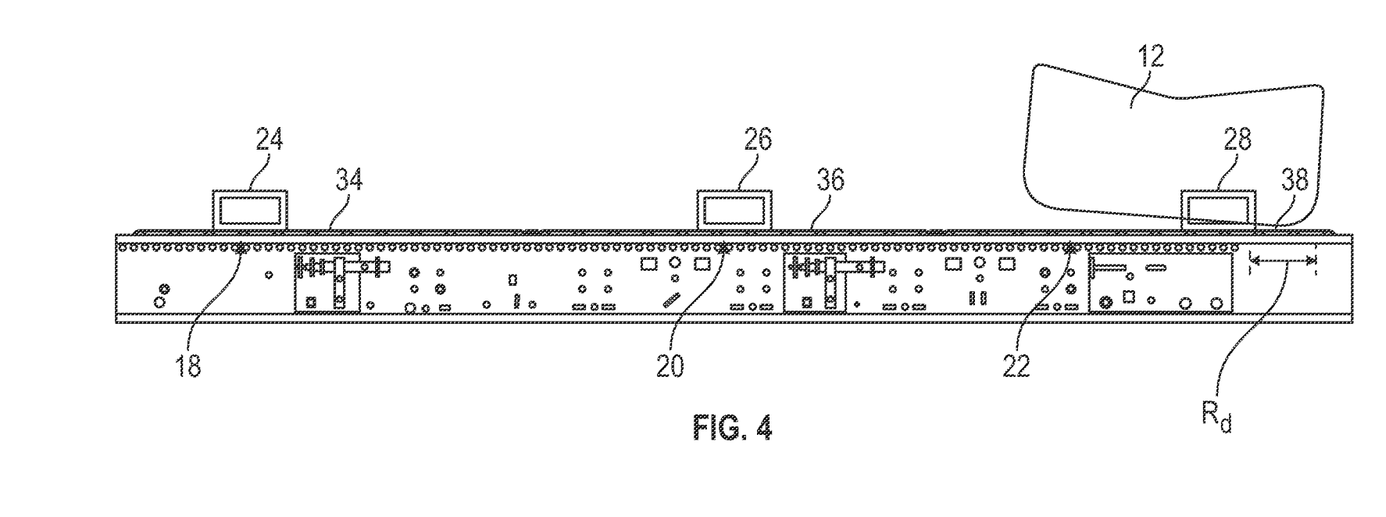
FIG. 4 is another side elevation view of the item assessment conveyor system of FIG. 1, depicting an item being conveyed at a decelerating conveyance rate.

The photo arrays 24, 26, and 28, are each positioned nearby, adjacent, or along their respective belt conveyor such that they are operable to sense or recognize a point, area, or region of contact between (i) an item conveyed by the respective conveyor and (ii) the conveying surface of the respective conveyor. The photo arrays 24, 26, and 28 are operable to sense the point, area, or region of contact in at least one dimension. In the illustrative embodiments, as best depicted in FIG. 2, the photo arrays perceive the item 12 and respective conveying surface 34, 36, or 38 from a location perpendicular to the forward direction of travel of the assessment conveyor system 10 such that the dimension to be sensed is parallel to the forward direction of travel of the assessment conveyor system 10. The dimension sensed by each photo array at the respective belt conveyor 18, 20, and 22 is representative of an item's 12 contact area relative to the respective conveying surface 34, 36, or 38. In other words, the photo array may sense that an item 12 is in contact with the respective conveying surface for a dimension of five inches (5 in.) in the direction parallel to the forward direction of travel. That five inch measurement is representative of the amount of contact between the item and the conveying surface in that one dimension of view only, and in most instances does not indicate that the item touches the conveying surface only along a five inch line. While the sensing system may be operable to recognize or sense points, areas, or regions of contact in more than one dimension, the system 10 is well suited for determining whether an item is non-conveyable based on measurements in only a single dimension. The photo arrays 24, 26, and 28 may utilize various types of photo arrays or photo sensors, including photoelectric sensors, for example (e.g. thru-beam sensors, retroreflective sensors, diffused sensors, laser photoelectric sensors, fiber optics photoelectric sensors, or remote photoelectric sensors). While the sensor system 16 as described herein for the illustrative embodiment utilizes photo arrays, it will be appreciated that other forms of sensors may be utilized including image-based camera system sensors, radio frequency identification (RFID) sensors, ultrasonic sensors, infrared sensors, LiDAR sensors, time of flight (ToF) sensors, and the like. The system 10 may assess other physical characteristics of the item 12, such as determining the weight of the item. For example, the system 10 may include a scale integrated with a conveyor (e.g. one of the belt conveyors) of the system 10 to determine the weight of an item as it is conveyed. Alternatively, the weight may be determined by scanning a label on the item and accessing a database of inventory item information to retrieve the item's information (e.g. weight) based on the scanned label While the divert system of the illustrative embodiment is depicted as a steerable wheel or ball transfer 32, it will be appreciated that any commonly known or readily available divert system may be utilized without substantially affecting the function of the system 10. For example, the divert system may utilize a right angle transfer (RAT) to divert the item 12 from the primary or main conveyor 30 or, alternatively, an operator (human or robot) may manually retrieve the non-conveyable item 12 from the primary conveyor 30.

Figure 5:
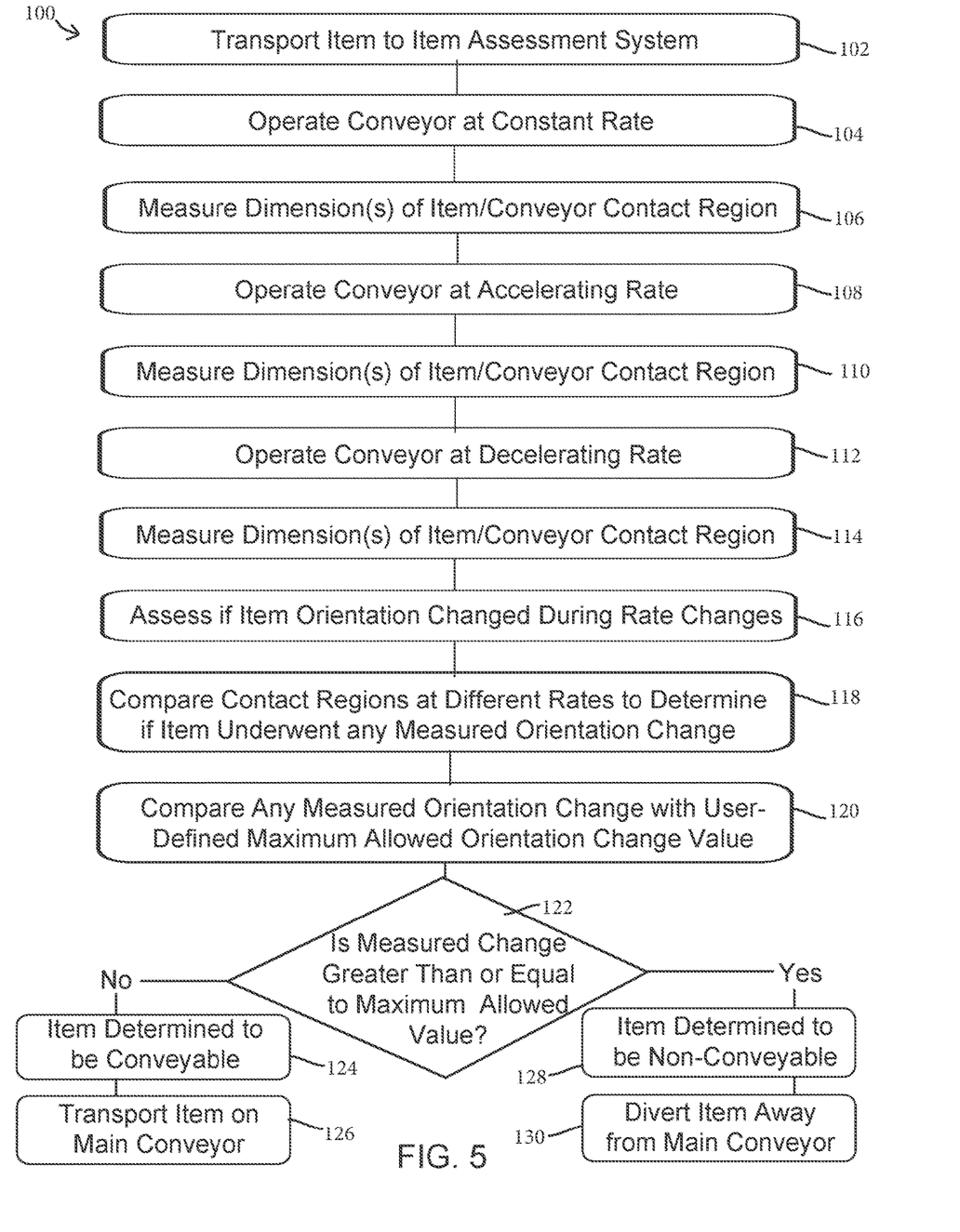
FIG. 5 is a diagram of a method for determining the conveyability of an item, in accordance with the present invention.

Referring to the illustrative embodiment of FIG. 5, a method 100 is provided for determining the conveyability of an item 12 being transported by a facility's material handling system 14. The method 100 includes transporting 102 a subject item 12 with an upstream portion of the material handling system 14 to an item assessment conveyor system, such as assessment system 10 described above and illustrated in FIGS. 1-4. The assessment system 10 is operable to convey an item 12 at varying rates, including a constant conveyance rate, an increasing or accelerating conveyance rate, and a decreasing or decelerating conveyance rate. Initially, the computer of the warehouse management system operates 104 the assessment system 10 at the constant conveyance rate and measures 106, with photo array 24 of the assessment system 10, a representative dimension Rc of a constant rate contact region of the item 12 (see Rc at belt conveyor 18 of FIG. 2). The constant rate contact region is defined as the region where the item 12 being conveyed on the assessment system 10 is in contact with the conveyance surface (e.g. surface 34) of the assessment system under a constant conveyance rate. The constant rate may be provided by moving the conveyor surface in either of the forward direction, or the reverse direction, at a constant rate, for example. Subsequently, the computer operates 108 the assessment system 10 at the accelerating conveyance rate and measures 110, with photo array 26 of the assessment system 10, a representative dimension Ra of an accelerating rate contact region (see Ra at belt conveyor 20 of FIGS. 2 and 3). The accelerating rate contact region is defined as the region where the item 12 being conveyed is in contact with the conveyance surface (e.g. surface 36) of the assessment system under an accelerating conveyance rate. The accelerating rate may include increasing the speed of the conveyer surface in the forward direction of travel, or with the item stationary on the conveyance surface, the conveyor may accelerate in a reverse direction, for example. Next, the computer operates 112 the assessment system 10 at the decelerating rate and measures 114, with photo array 28 of the assessment system 10, a representative dimension Rd of a decelerating rate contact region (see Rd at belt conveyor 22 of FIGS. 2 and 4). The decelerating rate contact region is defined as the region where the item 12 being conveyed is in contact with the conveyance surface (e.g. surface 38) of the assessment system under a decelerating conveyance rate. The decelerating rate may include decreasing the speed of the conveyer surface in the forward direction of travel, for example.

It will be appreciated that due to the physical characteristics of an item and its propensity to shift or experience a relative change in orientation during momentum changes (i.e. the item's contact region changes as the item accelerates and/or decelerates), the item's respective contact region dimensions Rc, Ra, and/or Rd may all be different from one another, may all be equal to one another, or two may be equal while the third is different than the equal two.

Based on the measured contact region dimensions Rc, Ra, and/or Rd, the method 100 assesses 116 whether the subject item has undergone a relative orientation change or has remained relatively stable (FIG. 5). The accessing or assessment 116 requires determining at 118 if there has been a relative orientation change of the subject item by comparing, with the computer, two or more of the measured contact region dimensions Rc, Ra, and/or Rc. In other words, the assessment 116 is based on whether one or both of the accelerating rate contact region dimension Ra and the decelerating rate contact region dimension Rd is/are different than the initial constant rate contact region dimension Rc. The method 100 includes comparing 120 the relative orientation change with a user defined maximum orientation change threshold. The user defined maximum orientation change value is chosen by the user or operator as a function what they deem is an acceptable amount of relative orientation change of an item to be safely handled by the main conveyor 30 of the material handling system 14. In other words, a user may consider that items exhibiting a relative orientation change of a certain value or above would cause jams or faults within the material handling system 14, and that any such item should be defined as a non-conveyable item and excluded from transport by the main conveyor 30. The method includes determining 122 whether the measured relative orientation change is greater than or equal to the user-defined maximum value (FIG. 5). It may be determined at 118 that there has been no relative orientation change of the item and the item is therefore be deemed at 124 conveyable and continues on to be transported 126 along the primary conveyor 30 (FIG. 5). Likewise, if it is determined at 118 that there has been some relative orientation change of the item but that the relative orientation change is less than the user defined maximum orientation change, the item 12 is deemed at 124 to be conveyable, and it continues on to be transported 126 along the primary conveyor 30. However, if it is determined at 118 that there has been a relative orientation change of the item 12 and that the relative orientation change is greater than the user defined maximum orientation change, the item 12 is deemed at 128 to be non-conveyable, and the computer controls the diverter 32 to divert 130 the non-conveyable item to a non-conveyable item handler 33 (FIG. 5).

In view of the illustrative embodiments of FIGS. 1-5, the measuring 106 of the constant rate contact region dimension includes measuring the dimension with the first sensor 24 positioned adjacent the first belt conveyor 18. Measuring 110 the accelerating rate contact region dimension includes measuring the dimension with the second sensor 26 positioned adjacent the second belt conveyor 20. And measuring 114 the decelerating rate contact region dimension includes measuring the dimension with the third sensor 28 positioned adjacent the third belt conveyor 22. However, it will be appreciated that in an embodiment with only a single, variable rate belt conveyor, the measuring steps of 106, 110, and 114 are performed with the same photo array (or other sensor system) that is positioned adjacent the single variable rate belt conveyor.

The following provides an example of the operation of the item assessment conveyor system 10. A user or operator determines what constitutes a conveyable item and what constitutes a non-conveyable item. For example, the user defines that any item exhibiting a change in orientation, as a function of a contact area change (between item and conveyor surface) due to changes in item momentum, of greater than or equal to four inches (4 in.) under either of an acceleration or deceleration indicates that an item is unsafe or unstable to be transported in the subject material handling system 14 and is therefore non-conveyable. Any item exhibiting a contact area change of less than four inches is determined safe and/or stable and therefore conveyable with the main conveyor 30 of the material handling system 14. A subject item 12 is conveyed with the first belt conveyor 18 at a constant rate and the first photo array 24 measures the dimension Rc of the contact region between the item 12 and conveyor surface 34 in the direction parallel to the forward direction of conveyance. The constant rate contact region dimension Rc is determined to be ten inches (10 in.). The item 12 is then conveyed with the second belt conveyor 20 at an accelerating rate and the second photo array 26 measures the dimension Ra of the contact region between the item 12 and conveyor surface 36 in the direction parallel to the forward direction of conveyance. The accelerating rate contact region dimension Ra is determined to be three inches (3 in.). The item 12 is then conveyed with the third belt conveyor 22 at a decelerating rate and the third photo array 28 measures the dimension Rd of the contact region between the item 12 and conveyor surface 36 in the direction parallel to the forward direction of conveyance. The decelerating rate contact region dimension Rd is determined to be eight inches (8 in.). As such, the change in contact region between the constant rate and the accelerating rate equals seven inches (7 in.) and the change in contact region between the constant rate and the decelerating rate equals two inches (2 in.). Therefore, because the change in contact region between constant and accelerating rates is greater than the user-defined maximum of four inches (i.e. 7 in.>4 in.), the item 12 is deemed non-conveyable and is diverted from the main conveyor 30. It will be appreciated that a change between the accelerating rate and the decelerating rate may be considered as well, or in the alternative, to determine conveyability of the item.

Thus, the item assessment conveyor system 10 and method 100 utilize varying conveyance rates to shift the momentum of an item being conveyed by the system, and based on any recognized changes in orientation of the item caused by momentum shifts, determining whether an item is stable or not. If an item is very unstable, or unstable to a level deemed unsatisfactory or unsafe, that item is deemed non-conveyable and diverted or otherwise removed from the system before it is transported downstream where it may affect the operation of the system or cause damage to the system or item. The system utilizes photo arrays, or other dimension sensing systems, to measure or detect dimensions of the contact region between the item being conveyed and the conveying surface. Dimensions of the contact region are measured under constant conveyance rates, accelerating conveyance rates, and decelerating conveyance rates to determine whether the item is conveyable or not. A user-defined value or threshold is pre-determined and represents the maximum allowable momentum shift (as a function of contact region dimension changes) is permitted to deem an item safe for conveying with the material handling system. The measured contact region changes are compared to the user-defined maximum change threshold, and if an item exhibits a contact region change greater than the maximum, the item is deemed non-conveyable.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A method of determining conveyability of an item transported on a transportation system in a material handling facility, said method comprising:
    transporting a subject item to an item assessment conveyor system configured to convey the subject item at varying rates comprising a constant rate and a changing rate;
    operating the assessment conveyor system at the constant rate and measuring, with a sensor system at the assessment conveyor system, a dimension of a constant rate contact region defined between the subject item being conveyed on the assessment conveyor system at the constant rate and a conveyance surface of the assessment conveyor system;
    operating the assessment conveyor system at the changing rate and measuring, with the sensor system, a dimension of a changing rate contact region defined between the subject item being conveyed on the assessment conveyor system at the changing rate and a conveyance surface of the assessment conveyor system;
    assessing whether the subject item is conveyable or non-conveyable, said assessing comprising:
        determining a relative orientation change of the subject item by comparing the dimension of the constant rate contact region and the dimension of the changing rate contact region; and
        comparing the relative orientation change with a user defined maximum orientation change threshold;
    wherein if the relative orientation change is less than the user defined maximum orientation change threshold, determining that the subject item is conveyable and continuing transporting the conveyable subject item with a conveyable item handling system of the transportation system; and
    wherein if the relative orientation change is greater than the user defined maximum orientation change threshold, determining that the subject item is non-conveyable and diverting the non-conveyable subject item to a non-conveyable item handling system in communication with the transportation system.

2. The method of claim 1, wherein said transporting the subject item at a changing rate comprises transporting the subject item at an accelerating rate and transporting the subject item at a decelerating rate;
    wherein said operating the assessment conveyor system at the changing rate comprises:
        operating the assessment conveyor system at the accelerating rate and measuring, with the sensor system, a dimension of an accelerating rate contact region defined between the subject item being conveyed on the assessment conveyor system at the accelerating rate and a conveyance surface of the assessment conveyor system; and
        operating the assessment conveyor system at the decelerating rate and measuring, with the sensor system, a dimension of a decelerating rate contact region defined between the subject item being conveyed on the assessment conveyor system at the decelerating rate and a conveyance surface of the assessment conveyor system; and
    wherein said determining a relative orientation change of the subject item comprises comparing at least two of the dimensions chosen from (i) the dimension of the constant rate contact region, (ii) the dimension of the accelerating rate contact region, and (iii) the dimension of the decelerating rate contact region.

3. The method of claim 2, wherein the assessment conveyor system comprises a plurality of consecutively spaced belt conveyors comprising a first belt conveyor, a second belt conveyor, and a third belt conveyor, wherein the first belt conveyor is configured to convey the subject item at the constant rate, the second belt conveyor is configured to convey the subject item at the accelerating rate, and the third belt conveyor is configured to convey the subject item at the decelerating rate, and said operating the assessment conveyor system at the constant rate comprises operating the first belt conveyor at the constant rate, said operating the assessment conveyor system at the accelerating rate comprises operating the second belt conveyor at the accelerating rate, and said operating the assessment conveyor system at the decelerating rate comprises operating the third belt conveyor at the decelerating rate.

4. The method of claim 3, wherein the sensor system comprises a first sensor at the first belt conveyor, a second sensor at the second belt conveyor, and a third sensor at the third belt conveyor and wherein said measuring the dimension of the constant rate contact region comprises measuring the dimension with the first sensor, said measuring the dimension of the accelerating rate contact region comprises measuring the dimension with the second sensor, and said measuring the dimension of the decelerating rate contact region comprises measuring the dimension with the third sensor.

5. The method of claim 1, wherein the dimension of the constant rate contact region and the dimension of the changing rate contact region each comprises a dimension that is parallel to a forward direction of travel of the assessment conveyor system.

6. A conveyability determination system for determining conveyability of an item in a material handling system, said conveyability determination system comprising:
    a conveyor system configured to operate at a plurality of different conveyance rates comprising a first conveyance rate and a second conveyance rate, to transport a subject item along said conveyor system;
    a sensor system proximate said conveyor system and configured to measure at least one dimension of a contact region defined between an item being conveyed on the conveyor system and a conveyance surface of the conveyor system, wherein the sensor system is operable to measure the dimension of the contact region at each of said plurality of conveyance rates; and a computer adapted to control said conveyor system and said sensor system, said computer adapted to:
  operate said conveyor system at said first conveyance rate and to measure, by controlling said sensor system, a dimension of a first conveyance rate contact region defined between the subject item being conveyed on said conveyor system at said first conveyance rate and a conveyance surface of said conveyor system;
  operate said conveyor system at said second conveyance rate and to measure, by controlling said sensor system, a dimension of a second conveyance rate contact region defined between the subject item being conveyed on said conveyor system at said second conveyance rate and a conveyance surface of said conveyor system; and
  assess whether the subject item is conveyable or non-conveyable by determining a relative orientation change of the subject item by comparing the dimension of the first conveyance rate contact region and the dimension of the second conveyance rate contact region.

7. The conveyability determination system of claim 6, wherein said plurality of different conveyance rates comprises said first conveyance rate, said second conveyance rate, and a third conveyance rate that is different than each of said first and second conveyance rates.

8. The conveyability determination system of claim 7, wherein said first conveyance rate comprises a constant conveyance rate, said second conveyance rate comprises an accelerating conveyance rate, and said third conveyance rate comprises a decelerating conveyance rate.

9. The conveyability determination system of claim 8, wherein said conveyor system comprises a first belt conveyor operable at a rate defining said constant conveyance rate, a second belt conveyor operable at a rate defining said accelerating conveyance rate, and a third belt conveyor operable at a rate defining said decelerating conveyance rate.

10. The conveyability determination system of claim 9, wherein said sensor system comprises a first sensor at said first belt conveyor and configured to measure the dimension of the contact region of an item conveyed on the first belt conveyor, a second sensor at said second belt conveyor and configured to measure the dimension of the contact region of an item conveyed on the second belt conveyor, and a third sensor at said third belt conveyor and configured to measure the dimension of the contact region of an item conveyed on the third belt conveyor.

11. The conveyability determination system of claim 6, wherein said sensor system is configured to measure a dimension of the contact region in a direction that is parallel to a forward direction of travel of the conveyor system.

12. The conveyability determination system of claim 6, wherein said computer is further adapted to said assess whether the subject item is conveyable or non-conveyable by:
  comparing the relative orientation change with a user defined maximum orientation change threshold;
  wherein said computer determines that the subject item is conveyable if the relative orientation change is less than the user defined maximum orientation change threshold; and
  wherein said computer determines that the subject item is non-conveyable if the relative orientation change is greater than or equal to the user defined maximum orientation change threshold.

13. The conveyability determination system of claim 12, wherein if said computer determines that the subject item is non-conveyable, said computer controls said conveyor system to divert the non-conveyable subject item to a non-conveyable item handling system in communication with said conveyor system.

14. The conveyability determination system of claim 13, wherein said non-conveyable item handling system comprises a diverter.

15. An item conveyability assessment system for a material handling system, said assessment system comprising:
  an assessment conveyor system configured to receive items from an upstream conveyance system and to convey a subject item at a plurality of rates as the subject item traverses said conveyor system, said plurality of rates comprise a first conveyance rate, a second conveyance, and a third conveyance rate, wherein each of said first, second, and third conveyance rates are different from one another;
  a sensor system proximate said conveyor system and configured to measure a dimension of a contact region defined between the subject item conveyed on said conveyor system and a conveyance surface of said conveyor system; and
  a computer in communication with and adapted to control said conveyor system and said sensor system, wherein said computer is configured to:
  control said conveyor system to operate at said first conveyance rate and control said sensor system to measure a dimension of a first conveyance rate contact region defined between the subject item being conveyed on said conveyor system at said first conveyance rate and said conveyance surface of said conveyor system;
  control said conveyor system to operate at said second conveyance rate and control said sensor system to measure a dimension of a second conveyance rate contact region defined between the subject item being conveyed on said conveyor system at said second conveyance rate and said conveyance surface of said conveyor system;
  control said conveyor system to operate at said third conveyance rate and control said sensor system to measure a dimension of a third conveyance rate contact region defined between the subject item being conveyed on said conveyor system at said third conveyance rate and said conveyance surface of said conveyor system;
  determine a relative orientation change of the subject item by comparing the dimension of at least two chosen from said first conveyance rate contact region, said second conveyance rate contact region, and said third conveyance rate contact region; and
  compare the relative orientation change with a user defined maximum orientation change threshold to determine whether the subject item is conveyable or non-conveyable.

16. The item conveyability assessment system of claim 15, wherein said computer is configured to determine that the subject item is conveyable if the relative orientation change is less than the user defined maximum orientation change threshold, and said computer is configured to determine that the subject item is non-conveyable if the relative orientation change is greater than or equal to the user defined maximum orientation change threshold.

17. The item conveyability assessment system of claim 16, wherein if said computer determines that the subject item is non-conveyable, said computer controls said conveyor system to divert the non-conveyable subject item to a non-conveyable item handling system configured to receive and handle non-conveyable items.

18. The item conveyability assessment system of claim 17, further comprises a transfer diverter controlled by said computer and configured to divert non-conveyable items to said non-conveyable item handling system.

19. The item conveyability assessment system of claim 15, wherein said first conveyance rate comprises a constant conveyance rate, said second conveyance rate comprises an accelerating conveyance rate, and said third conveyance rate comprises a decelerating conveyance rate.

20. The item conveyability assessment system of claim 15, wherein said sensor system comprises a photo array.

* * * * *